United States Patent
Damnjanovic et al.

(10) Patent No.: US 12,513,498 B2
(45) Date of Patent: Dec. 30, 2025

(54) INDOOR COMMUNICATION MODE FOR USER EQUIPMENT

(71) Applicant: QUALCOMM Incorporated, San Diego, CA (US)

(72) Inventors: Aleksandar Damnjanovic, Del Mar, CA (US); Xiaoxia Zhang, San Diego, CA (US); Tao Luo, San Diego, CA (US); Juan Montojo, San Diego, CA (US); Arumugam Chendamarai Kannan, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/454,559

(22) Filed: Nov. 11, 2021

(65) Prior Publication Data
US 2022/0167131 A1    May 26, 2022

Related U.S. Application Data

(60) Provisional application No. 63/116,644, filed on Nov. 20, 2020.

(51) Int. Cl.
*H04W 4/38* (2018.01)
*H04W 4/33* (2018.01)

(52) U.S. Cl.
CPC ............... *H04W 4/38* (2018.02); *H04W 4/33* (2018.02)

(58) Field of Classification Search
CPC .................................. H04W 4/38; H04W 4/33
USPC ........................................................ 370/329
See application file for complete search history.

(56) References Cited

U.S. PATENT DOCUMENTS

| | | | |
|---|---|---|---|
| 2006/0165032 A1* | 7/2006 | Hamalainen | H04W 52/40 370/328 |
| 2006/0257443 A1* | 11/2006 | Johal | A01N 65/44 424/731 |
| 2009/0061939 A1* | 3/2009 | Andersson | H04B 7/082 455/562.1 |
| 2013/0122035 A1* | 5/2013 | Sheng | A61K 36/17 424/725 |
| 2013/0122935 A1* | 5/2013 | Das | H04W 4/029 455/456.6 |
| 2013/0237245 A1* | 9/2013 | Tinnakornsrisuphap | H04W 24/02 455/456.1 |

(Continued)

FOREIGN PATENT DOCUMENTS

| | | | |
|---|---|---|---|
| EP | 3360369 A1 | 8/2018 | |
| WO | WO-2017061921 A1 * | 4/2017 | ........... H04B 17/318 |
| WO | 2021021524 A1 | 2/2021 | |

OTHER PUBLICATIONS

International Search Report and Written Opinion—PCT/US2021/072392—ISA/EPO—Feb. 25, 2022.

*Primary Examiner* — Faruk Hamza
*Assistant Examiner* — Jean F Voltaire
(74) *Attorney, Agent, or Firm* — Harrity & Harrity, LLP

(57) ABSTRACT

Various aspects of the present disclosure generally relate to wireless communication. In some aspects, a user equipment (UE) may determine that the UE is located in an indoor environment. The UE may communicate using an indoor communication mode based at least in part on determining that the UE is located in the indoor environment. Numerous other aspects are provided.

30 Claims, 8 Drawing Sheets

(56) References Cited

U.S. PATENT DOCUMENTS

| | | | |
|---|---|---|---|
| 2014/0136044 A1* | 5/2014 | Conrad | G01S 13/931 701/23 |
| 2015/0097731 A1* | 4/2015 | Russell | G01S 5/012 342/450 |
| 2015/0133173 A1* | 5/2015 | Edge | G01S 5/08 455/456.6 |
| 2015/0271632 A1* | 9/2015 | Venkatraman | H04W 24/08 455/456.2 |
| 2015/0341753 A1* | 11/2015 | Chen | H04B 17/318 455/456.1 |
| 2016/0003949 A1* | 1/2016 | Venkataraman | G01S 19/24 342/357.29 |
| 2018/0302892 A1* | 10/2018 | Ökvist | H04W 36/00837 |
| 2019/0281412 A1* | 9/2019 | Yang | H04W 4/029 |
| 2020/0105288 A1* | 4/2020 | Cheung | H04R 25/405 |
| 2021/0182545 A1 | 6/2021 | Chae et al. | |

\* cited by examiner

INDOOR COMMUNICATION MODE FOR USER EQUIPMENT

CROSS-REFERENCE TO RELATED APPLICATION

This patent application claims priority to U.S. Provisional Patent Application No. 63/116,644, filed on Nov. 20, 2020, entitled "INDOOR COMMUNICATION MODE FOR USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for an indoor communication mode for user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that the UE is located in an indoor environment; and communicating using an indoor communication mode based at least in part on determining that the UE is located in the indoor environment.

In some aspects, a method of wireless communication performed by a wireless communication device includes determining that a UE is located in an indoor environment; and transmitting, to the UE, an environmental indication that indicates that the UE is located in the indoor environment.

In some aspects, a UE for wireless communication includes a memory and one or more processors coupled to the memory, the memory and the one or more processors configured to: determine that the UE is located in an indoor environment; and communicate using an indoor communication mode based at least in part on determining that the UE is located in the indoor environment.

In some aspects, a wireless communication device for wireless communication includes a memory and one or more processors coupled to the memory, the memory and the one or more processors configured to: determine that a UE is located in an indoor environment; and transmit, to the UE, an environmental indication that indicates that the UE is located in the indoor environment.

In some aspects, a non-transitory computer-readable medium storing a set of instructions for wireless communication includes one or more instructions that, when executed by one or more processors of a UE, cause the UE to: determine that the UE is located in an indoor environment; and communicate using an indoor communication mode based at least in part on determining that the UE is located in the indoor environment.

In some aspects, a non-transitory computer-readable medium storing a set of instructions for wireless communication includes one or more instructions that, when executed by one or more processors of a wireless communication device, cause the wireless communication device to: determine that a UE is located in an indoor environment; and transmit, to the UE, an environmental indication that indicates that the UE is located in the indoor environment.

In some aspects, an apparatus for wireless communication includes means for determining that the apparatus is located in an indoor environment; and means for communicating using an indoor communication mode based at least in part on determining that the apparatus is located in the indoor environment.

In some aspects, an apparatus for wireless communication includes means for determining that a UE is located in an indoor environment; and means for transmitting, to the UE, an environmental indication that indicates that the UE is located in the indoor environment.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
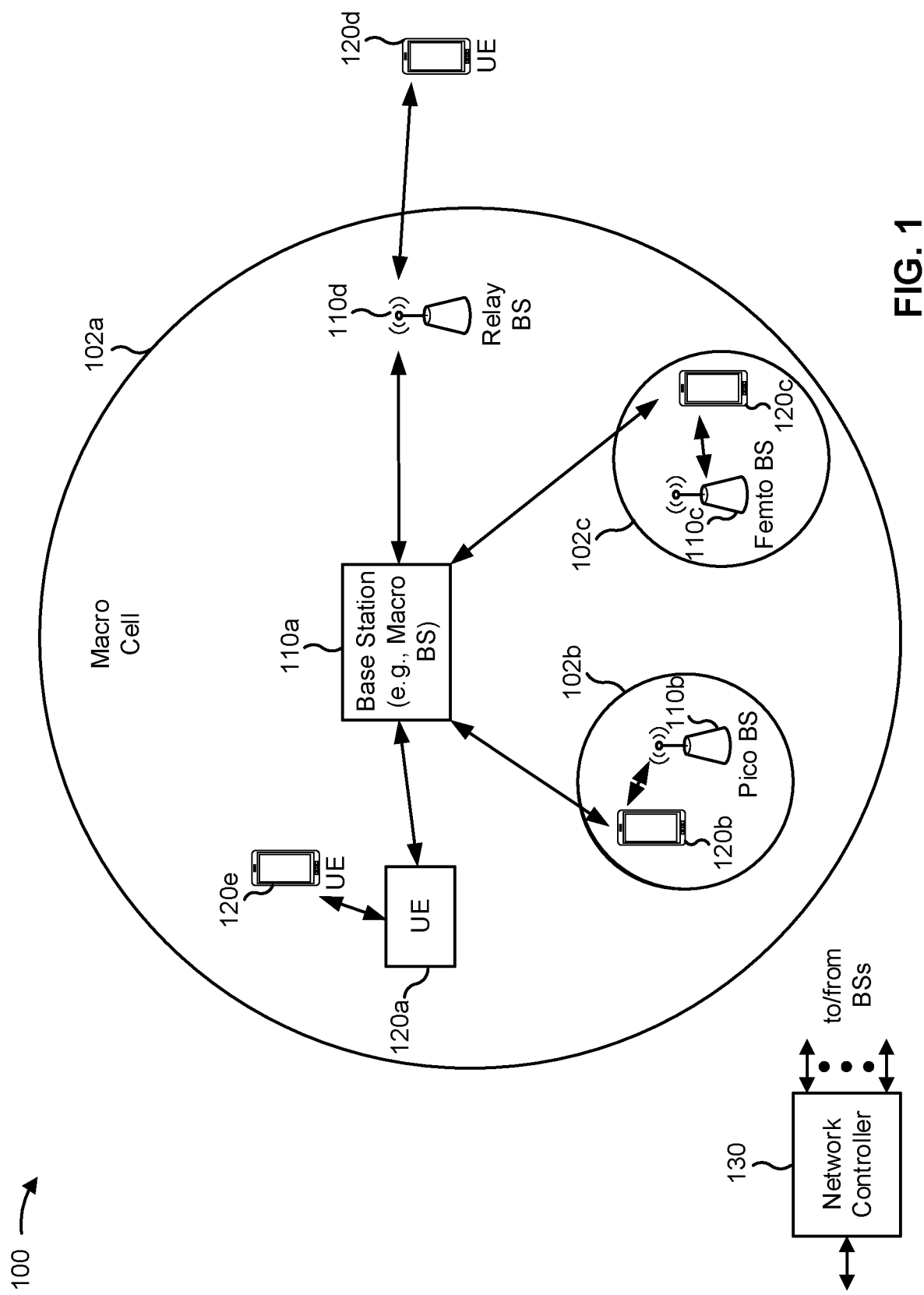
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
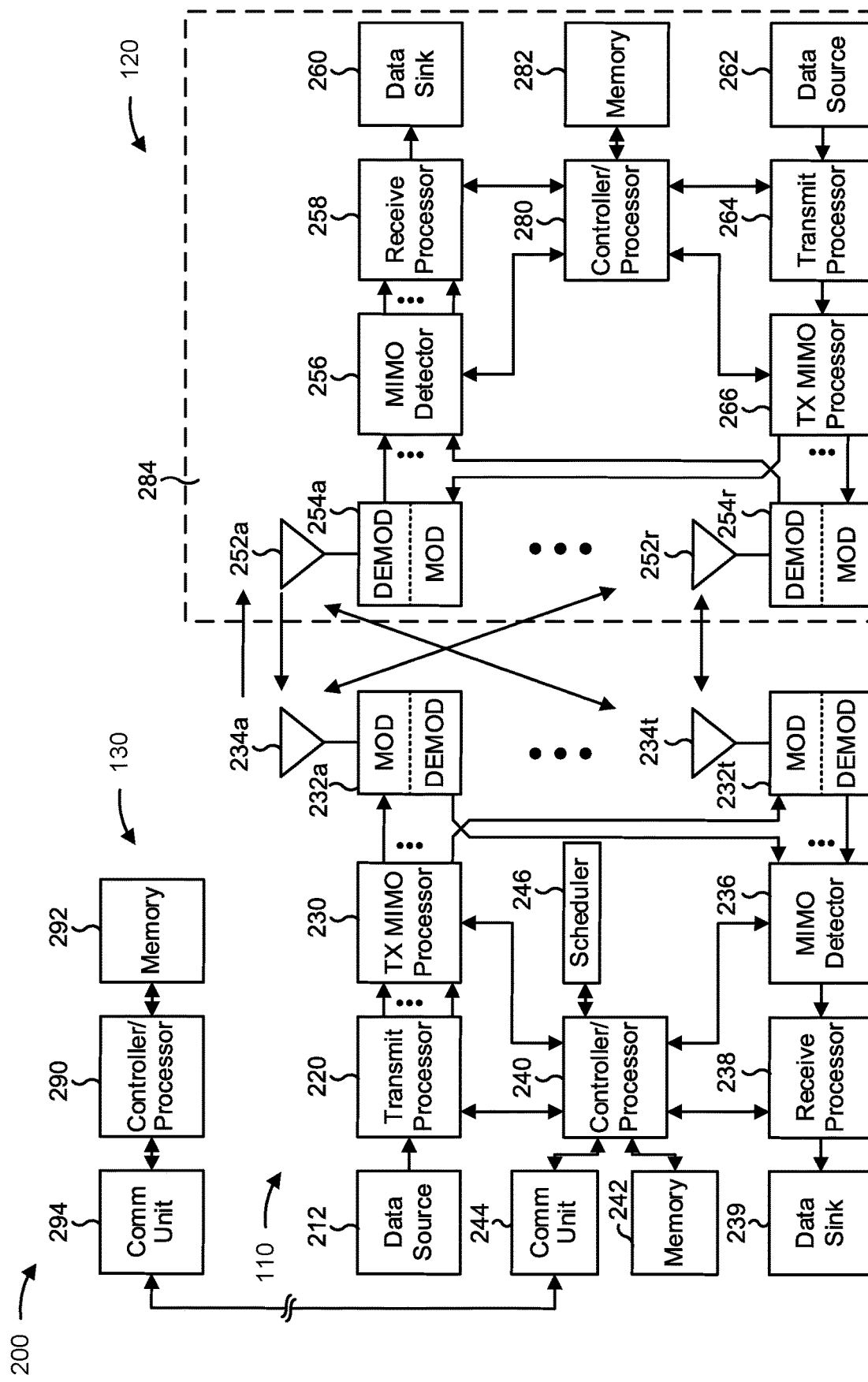
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with an indoor communication mode for UEs, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, the UE includes means for obtaining, using a sensor, one or more sensor measurements associated with the indoor environment. In some aspects, the UE includes means for comparing the one or more sensor measurements to information in a knowledge database. In some aspects, the UE includes means for receiving an environmental indication from an access point. In some aspects, the UE includes means for receiving a signal from an access point or means for performing one or more measurements associated with the signal.

In some aspects, the UE includes means for detecting a transition of the UE from the indoor environment to an outdoor environment and/or means for communicating using an outdoor communication mode based at least in part on detecting the transition. In some aspects, the UE includes means for detecting a transition of the UE from the indoor environment to a partial indoor environment and/or means for communicating using a partial indoor communication mode based at least in part on detecting the transition. In some aspects, the UE includes means for transmitting, to a wireless communication device, an environmental status indication that indicates that the UE is located in the indoor environment.

In some aspects, a wireless communication device includes means for determining that a UE is located in an indoor environment and/or means for transmitting, to the UE, an environmental indication that indicates that the UE is located in the indoor environment. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for receiving a signal from the UE or means for performing one or more measurements associated with the signal. In some aspects, the wireless communication device includes means for detecting a transition of the UE from the indoor environment to a partial indoor environment and/or means for transmitting, to the UE, an environmental indication that indicates that the UE is located in the indoor environment. In some aspects, the wireless communication device includes means for transmitting, to an additional wireless communication device, an environmental status indication that indicates that the UE is located in the indoor environment.

As indicated above, FIG. 2 is provided as an example. Other examples may differ from what is described with regard to FIG. 2.

Figure 3:
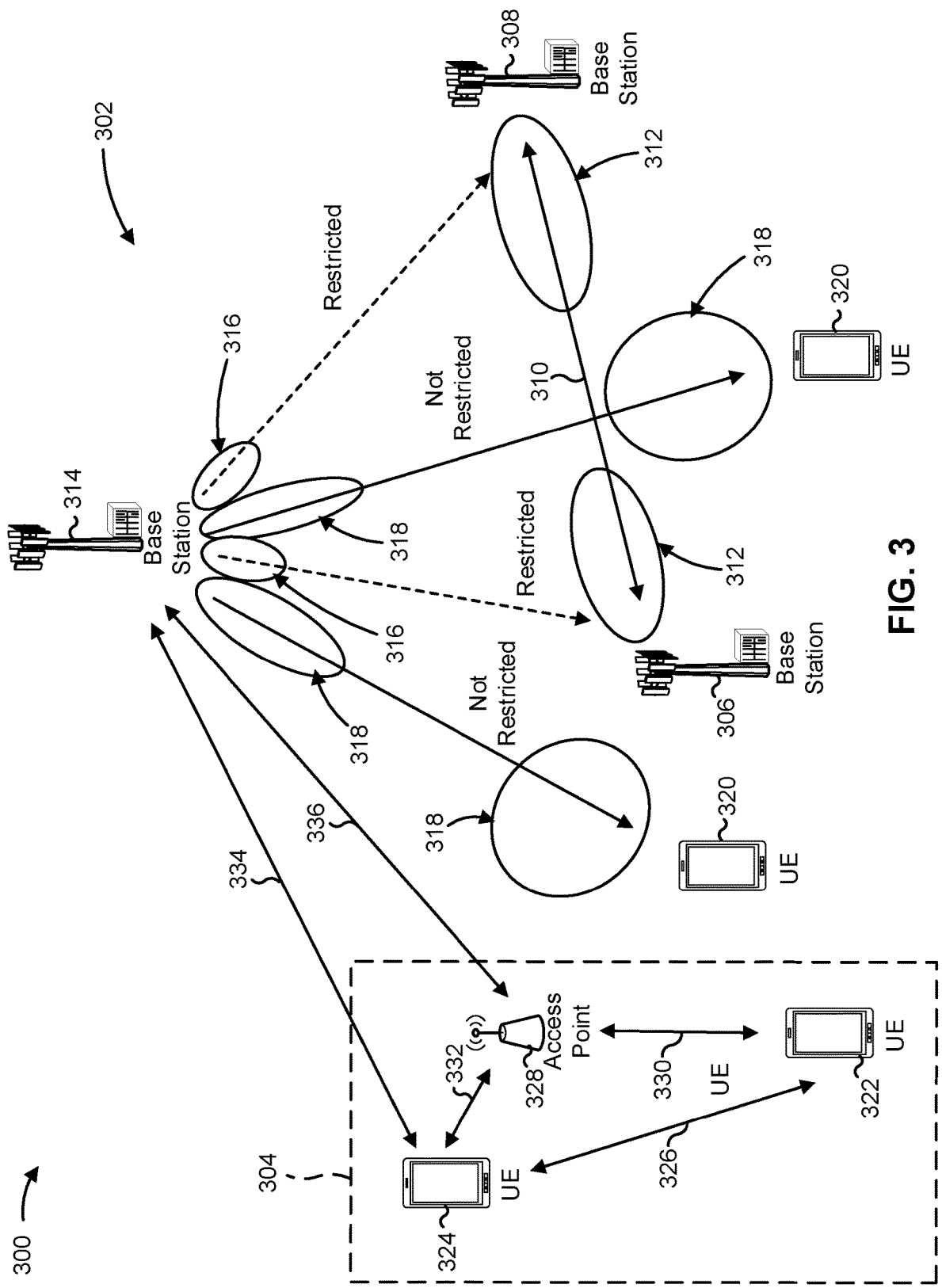
FIG. 3 is a diagram illustrating an example associated with wireless communication environments, in accordance with the present disclosure.

FIG. 3 is a diagram illustrating an example associated with wireless communication environments, in accordance with the present disclosure. FIG. 3 depicts an outdoor environment 302 and an indoor environment 304.

In some aspects, an outdoor environment may include a wireless communication environment that is located outdoors and an indoor environment may include a wireless communication environment that is located indoors. In some implementations, an indoor environment may be an environment that causes a specified amount of radio signal loss associated with a radio signal being transmitted between a device in the indoor environment and a device in the outdoor environment. In some implementations, an indoor environment may be an environment in which a device is completely enclosed. For example, an indoor environment may be an environment in which a signal transmitted between a device located in an indoor environment to a device located in an adjacent outdoor environment is attenuated by a physical barrier. In some implementations, an indoor environment may be an environment that provides protection to one or more communication links in an adjacent outdoor environment from receiving a level of interference from a UE located in the indoor environment that satisfies an indoor environment condition. For example, the indoor environment condition may include an interference threshold, among other examples. In various implementations, an indoor environment may include an interior of a building, a vehicle, and/or a cave, among other examples.

A partially indoor environment may include an environment that includes one or more characteristics of an indoor environment and one or more characteristics of an outdoor environment. For example, a partially indoor environment may be an environment in which a signal transmitted between a device located in an indoor environment to a device located in an adjacent outdoor environment is attenuated by a physical barrier, where the attenuation is less than that associated with an indoor environment. In some implementations, a partially indoor environment may be an environment that provides protection to one or more communication links being transmitted in an adjacent outdoor environment from receiving a level of interference from a UE located in the indoor environment that satisfies a partially indoor environment condition. For example, the partially indoor environment condition may include an interference threshold that is less than an interference threshold associated with an indoor environment. For example, a partially indoor environment may include a covered deck, a patio with an umbrella, a parking garage, and/or an interior of a tent, among other examples.

The wireless communications depicted in FIG. 3 may utilize millimeter wave communications. Co-primary licensed millimeter wave use may be enabled by taking advantage of the highly directive nature of communication links in this high band spectrum. For example, millimeter wave frequencies may allow for use of advanced antenna arrays for beamforming and beam tracking to provide connectivity in both line-of-sight and non-line-of-sight conditions by leveraging path diversity and reflections.

As shown in FIG. 3, a base station 306 may communicate with a base station 308 via a communication link 310. A pair of beams 312 may be associated with the communication link 310. The communication link 310 may be referred to as an incumbent link, and the base stations 306 and 308 may be referred to as incumbent devices. Incumbent devices and/or incumbent links are devices and/or links, respectively, that have been established prior to introduction of a new wireless communication paradigm. In the case of millimeter wave communication, incumbent links often include fixed point-to-point links between fixed devices. In some implementations, for example, base stations 306 and/or 308 may provide backhaul services for an integrated access and backhaul (IAB) network. In some cases, regulations may require protection of incumbent communication links when carriers introduce new communication paradigms (e.g., when implementing a mobile millimeter wave network).

In many cases, incumbent links in millimeter wave wireless communication systems involve line-of-sight communications between the transmitter and receiver, as the beams are often fairly narrow. When a new base station is introduced, for example, coexistence of communication links may be enabled based on interference analysis, which may be performed by base stations and/or UEs. For example, a new base station 314 may be introduced and, to protect the incumbent link 310, certain communication directions may be restricted (e.g., prohibited and/or restricted to certain beams, bandwidths, and/or transmission power), as indicated by the dashed arrows associated with beams 316. Other links may be permitted without restriction, as indicated by the solid arrows associated with beams 318. These links may be between the base station 314 and one or more other base stations, relay devices, and/or UEs 320, among other examples.

For example, in order to enable mobile use cases, the interference analysis may prohibit transmission in a direction of the incumbent receiver. In some cases, mobile devices may be unlikely to be in line of site of the incumbent point to point link receivers and since the base station 314 may control communications with mobile devices 320, the base station 314 may perform interference analysis to determine whether the mobile devices 320 may cause interference to the incumbent link 310. In addition to, or in lieu of, restricting directions of communication, other techniques may be used to facilitate protection of incumbent links. For example, link redundancy and advanced beam management may enable flexibility for beam selection. Database aided protection may be used and/or measurement-aided protection may be used. Many of these protections may result in reduced capabilities of the UEs 320 and/or wireless networks serving the UEs 320, which may degrade UE performance. These reductions in capability and performance may be present whether the UE 320 is located in an outdoor environment or an indoor environment.

However, communications in an indoor environment (or a partially indoor environment) may support advanced use cases while posing less risk of harmful interference to outdoor incumbent links than may be posed by communications in an outdoor environment due to the building entry and exit losses for corresponding frequencies. As shown in FIG. 3, for example, a UE 322 located in an indoor environment may communicate with another UE 324 via a communication link 326 that is located in the indoor environment. The UE 322 may communicate with an access point 328 using a communication link 330, and/or the UE 324 may communicate with the access point 328 using a communication link 332. Because the communication links are located within the indoor environment, they may pose less risk of interference to the incumbent link 310 than outdoor communications such as the communication link 334 between the UE 324 and the base station 314, and/or the communication link 336 between the access point 328 and the base station 314. Professionally installed fixed indoor devices may be configured with increased functionality as they are unlikely to pose an interference risk to outdoor incumbent links. However, the UEs 322 and 324, which may move between indoor and outdoor environments, may be configured with risk mitigation restrictions that may unnecessarily restrict functionality within the indoor environment 304, leading to decreased device and/or network performance.

Aspects of techniques and apparatuses described herein may facilitate providing an indoor environment operating mode that allows a device to operate with enhanced functionality when the device is located in an indoor environment as compared to functionality of the device when the device is located in an outdoor environment. In some aspects, a UE may determine that the UE is located in an indoor environment and, based at least in part on the determination, may communicate using an indoor communication mode. The UE may determine that the UE is located in an indoor environment using a sensor such as a radar device and/or a light detection and ranging (LIDAR) device, among other examples. In some aspects, the UE may determine that the UE is located in the indoor environment based at least in part on receiving an environmental indication from an access point and/or based at least in part on performing measurements associated with a signal received from an access point. Similarly, in some aspects, the UE may detect a transition to a partially indoor environment and, based at least in part on that detection, may operate in accordance with a partially indoor communication mode.

In this way, aspects may facilitate enabling enhanced functionality of a UE when the UE is located in an indoor or partially indoor environment, while protecting incumbent links from interference by the UE while the UE is located in an outdoor environment. As a result, aspects may facilitate improved UE performance and/or improved network performance.

As indicated above, FIG. 3 is provided as an example. Other examples may differ from what is described with respect to FIG. 3.

Figure 4:
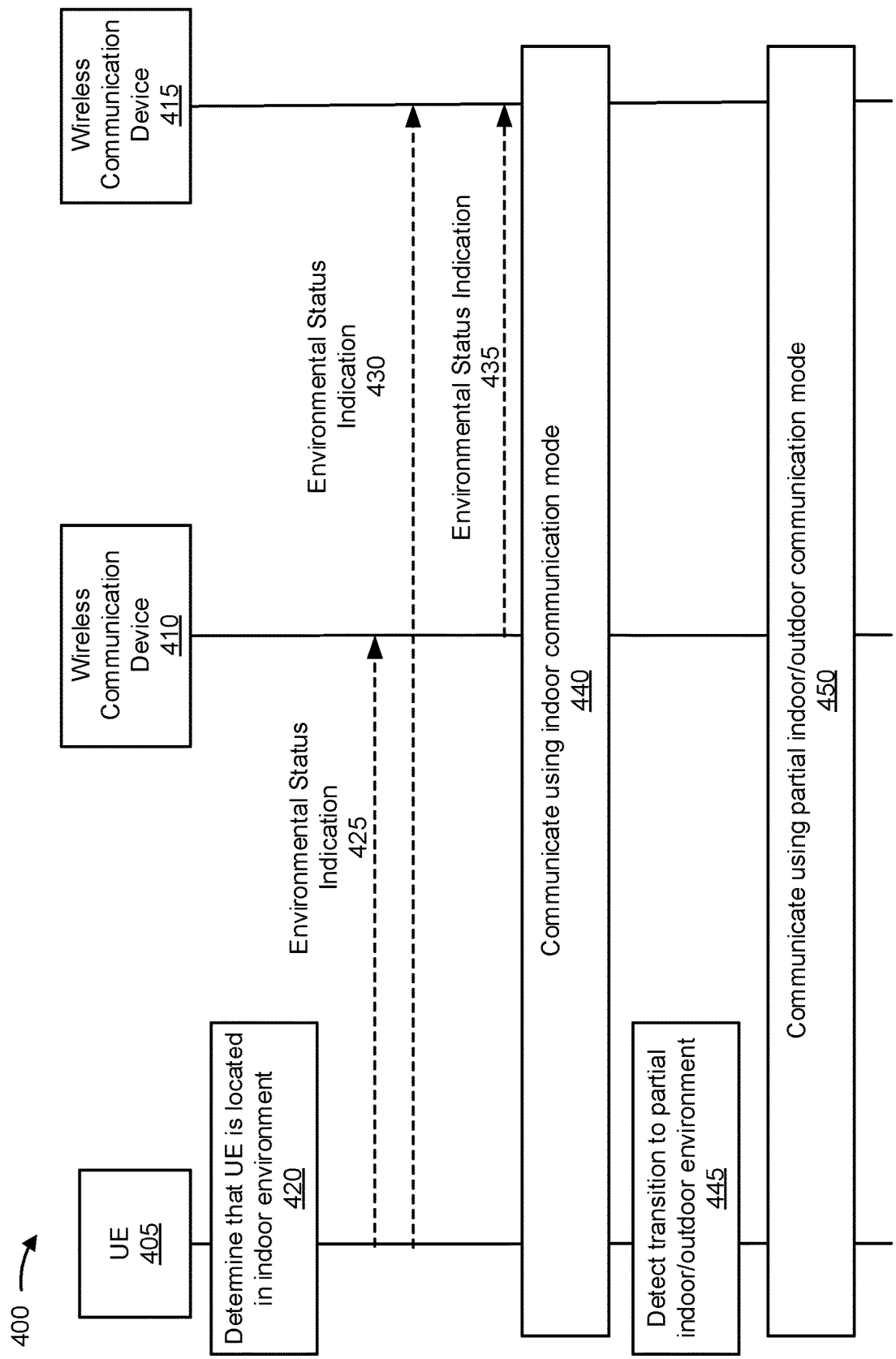
FIG. 4 is a diagram illustrating an example associated with an indoor communication mode for user equipment, in accordance with the present disclosure.

FIG. 4 is a diagram illustrating an example 400 associated with an indoor communication mode for a UE, in accordance with the present disclosure. As shown in FIG. 4, a UE 405, a wireless communication device 410, and a wireless communication device 415 may communicate with one another. In some aspects, the wireless communication device 410 may be an access point and/or a base station. In some aspects, the wireless communication device 415 may be an access point and/or a base station.

As shown by reference number 420, the UE 405 may determine that the UE 405 is located in an indoor environment. In some aspects, the UE 405 may obtain, using a sensor, one or more sensor measurements associated with the indoor environment. The UE 405 may determine that the UE is located in the indoor environment based at least in part on the one or more sensor measurements. For example, the sensor may include a radar device and/or a LIDAR device, among other examples. In some aspects, the UE 405 may compare the one or more sensor measurements to information in a knowledge database and determine that the UE 405 is located in the indoor environment based at least in part on comparing the one or more sensor measurements to the information. For example, a database stored at the UE 405, at a wireless communication device 410 (e.g., an access point), or other device may include a mapping between sensor measurements and environments.

In some aspects, the UE 405 may generate a sensing measurement report. The sensing measurement report may include any number of different types of information associated with the one or more sensor measurements. For example, the sensing measurement report may indicate the one or more sensor measurements, settings associated with the sensors, measurement times, measurement locations, and/or information derived from any of the above, among other examples. The UE 405 may transmit the sensing measurement report to the wireless communication device 410. In some aspects, the wireless communication device 410 may determine an environmental status (e.g., whether the UE 405 is in an indoor environment, an outdoor environment, or a partial indoor environment) associated with the UE 405 based at least in part on the sensing measurement report. The wireless communication device 410 may configure, based at least in part on determining the environmental status associated with the UE 405, a set of transmission parameters associated with the UE 405. In some aspects, the wireless communication device 410 may transmit the set of transmission parameters to the UE 405.

In some aspects, the UE 405 may receive an environmental indication from an access point and determine that the UE is located in the indoor environment based at least in part on the environmental indication. The environmental indication may be an explicit indication that indicates that the UE 405 is located in the indoor environment. In some aspects, the environmental indication may include an implicit indication (e.g., a measurement associated with a sensor and/or a transmitted signal) that the UE 405 is located in the indoor environment. In some aspects, for example, a wireless communication device 410 may receive a signal from the UE 405 and determine, based at least in part on one or more measurements associated with the signal, that the UE 405 is located in an indoor environment. The wireless communication device 410 may indicate to the UE 405 that the UE 405 is in the indoor environment. In some aspects, the UE 405 may receive a signal from the UE 405 and perform one or more measurements associated with the signal. The UE 405 may determine that the UE 405 is located in the indoor environment based at least in part on the one or more measurements associated with the signal.

As shown by reference number 425, the UE 405 may transmit, to the wireless communication device 410 (e.g., an access point), an environmental status indication that indicates that the UE 405 is located in the indoor environment. As shown by reference number 430, the UE 405 may, alternatively or additionally, transmit an environmental status indication to the wireless communication device 415 (e.g., a base station). As shown by reference number 435, the wireless communication device 410 may transmit an environmental status indication indicating that the UE 405 is located in the indoor environment to the wireless communication device 415.

As shown by reference number 440, the UE 405 may communicate using an indoor communication mode based at least in part on determining that the UE 405 is located in the indoor environment. In some aspects, an indoor communication mode may be a mode in which one or more communication parameters are adjusted as compared to an outdoor communication mode. For example, in an indoor communication mode, a transmission power level may be greater than a transmission power level in an outdoor communication mode and/or a different beam and/or frequency may be used than would be used for an outdoor communication mode, among other examples.

As shown by reference number 445, the UE 405 may detect a transition of the UE 405 from the indoor environment to an outdoor environment. In some aspects, detecting the transition of the UE 405 from the indoor environment to the outdoor environment may include detecting the transition based at least in part on determining that a transition time condition is satisfied. For example, in some aspects, a time condition may be established such that the UE 405 may detect the transition only if a change in sensor measurements and/or signal measurements has a duration that satisfies the time condition. In this way, for example, if the UE 405 moves to the outdoor environment and then returns to the indoor environment quickly, the communication mode need not be changed twice. In some aspects, the UE 405 may detect a transition of the UE 405 from the indoor environment to a partial indoor environment.

As shown by reference number 450, the UE 405 may communicate using an outdoor communication mode based at least in part on detecting the transition to the outdoor environment. As also shown by reference number 450, the UE 405 may communicate using a partial indoor communication mode based at least in part on detecting the transition to the partial indoor environment.

As described above, aspects may facilitate enabling enhanced functionality of a UE 405 when the UE 405 is located in an indoor or partially indoor environment, while protecting incumbent links from interference by the UE 405 while the UE 405 is located in an outdoor environment. As a result, aspects may facilitate improved UE 405 performance and/or improved network performance.

As indicated above, FIG. 4 is provided as an example. Other examples may differ from what is described with respect to FIG. 4.

Figure 5:
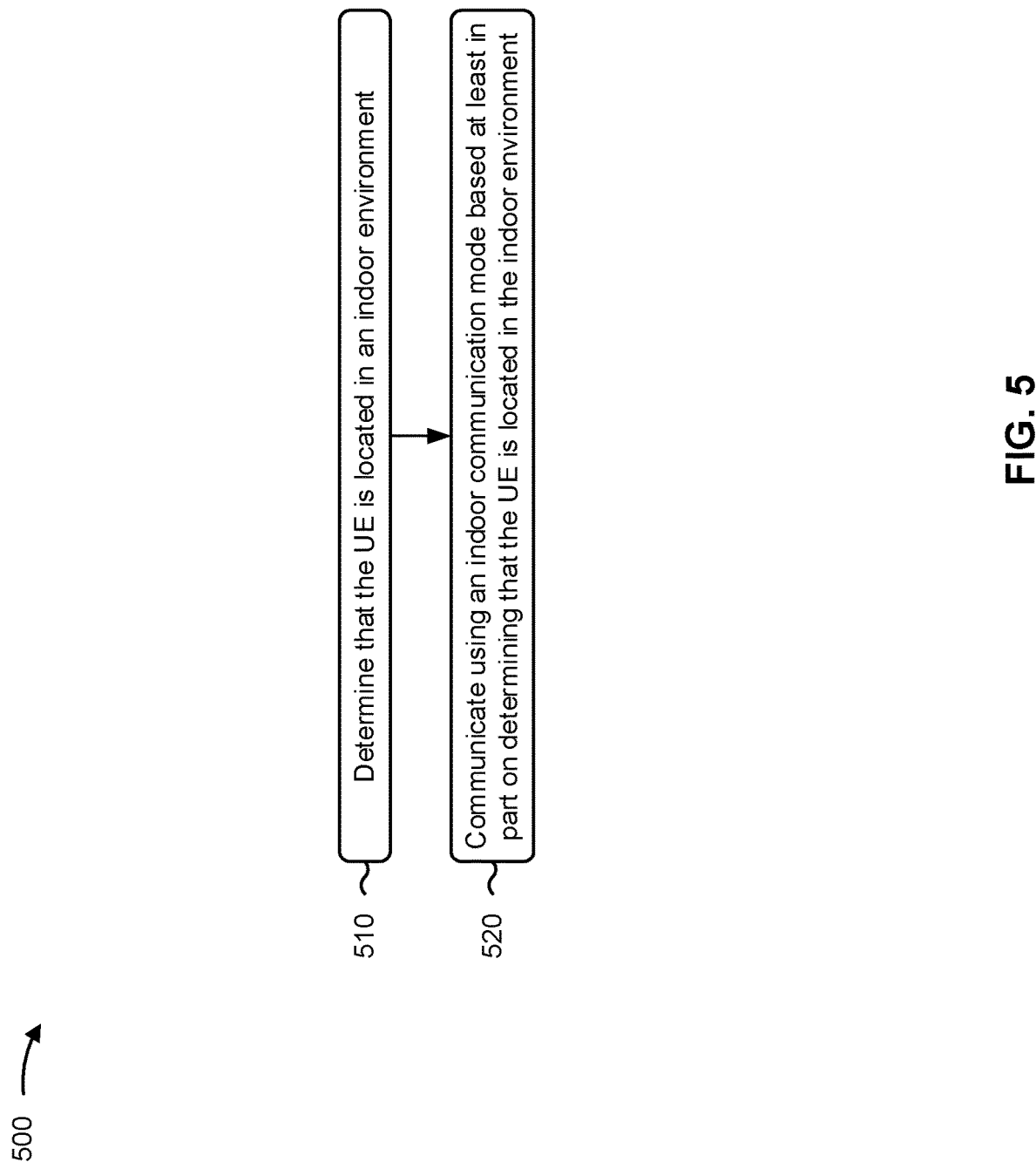
FIGS. 5 and 6 are diagrams illustrating example processes associated with an indoor communication mode for user equipment, in accordance with the present disclosure.

FIG. 5 is a diagram illustrating an example process 500 performed, for example, by a UE, in accordance with the present disclosure. Example process 500 is an example where the UE (e.g., UE 405) performs operations associated with an indoor communication mode for UEs.

As shown in FIG. 5, in some aspects, process 500 may include determining that the UE is located in an indoor environment (block 510). For example, the UE (e.g., using determination component 708, depicted in FIG. 7) may determine that the UE is located in an indoor environment, as described above.

As further shown in FIG. 5, in some aspects, process 500 may include communicating using an indoor communication mode based at least in part on determining that the UE is located in the indoor environment (block 520). For example, the UE (e.g., using reception component 702 and/or transmission component 704, depicted in FIG. 7) may communicate using an indoor communication mode based at least in part on determining that the UE is located in the indoor environment, as described above.

Process 500 may include additional aspects, such as any single aspect or any combination of aspects described below and/or in connection with one or more other processes described elsewhere herein.

In a first aspect, process 500 includes obtaining, using a sensor, one or more sensor measurements associated with the indoor environment, wherein determining that the UE is located in the indoor environment comprises determining that the UE is located in the indoor environment based at least in part on the one or more sensor measurements.

In a second aspect, alone or in combination with the first aspect, the sensor comprises a radar device.

In a third aspect, alone or in combination with one or more of the first and second aspects, the sensor comprises a light detection and ranging device.

In a fourth aspect, alone or in combination with one or more of the first through third aspects, process 500 includes comparing the one or more sensor measurements to information in a knowledge database, wherein determining that the UE is located in the indoor environment comprises determining that the UE is located in the indoor environment based at least in part on comparing the one or more sensor measurements to the information.

In a fifth aspect, alone or in combination with one or more of the first through fourth aspects, process 500 includes generating a sensing measurement report that indicates the one or more sensor measurements, transmitting the sensing measurement report to a wireless communication device, and receiving an environmental indication from the wireless communication device, wherein the environmental indication is based at least in part on the sensing measurement report.

In a sixth aspect, alone or in combination with the fifth aspect, process 500 includes receiving a set of transmission parameters from the wireless communication device, wherein the set of transmission parameters is based at least in part on the environmental indication.

In a seventh aspect, alone or in combination with one or more of the first through sixth aspects, process 500 includes receiving an environmental indication from an access point, wherein determining that the UE is located in the indoor environment comprises determining that the UE is located in the indoor environment based at least in part on the environmental indication.

In an eighth aspect, alone or in combination with one or more of the first through seventh aspects, process 500 includes receiving a signal from an access point, and performing one or more measurements associated with the signal, wherein determining that the UE is located in the indoor environment comprises determining that the UE is located in the indoor environment based at least in part on the one or more measurements associated with the signal.

In a ninth aspect, alone or in combination with one or more of the first through eighth aspects, process 500 includes detecting a transition of the UE from the indoor environment to an outdoor environment, and communicating using an outdoor communication mode based at least in part on detecting the transition.

In a tenth aspect, alone or in combination with the ninth aspect, detecting the transition of the UE from the indoor environment to the outdoor environment comprises detecting the transition of the UE from the indoor environment to the outdoor environment based at least in part on determining that a transition time condition is satisfied.

In an eleventh aspect, alone or in combination with one or more of the first through tenth aspects, process 500 includes detecting a transition of the UE from the indoor environment to a partial indoor environment, and communicating using a partial indoor communication mode based at least in part on detecting the transition.

In a twelfth aspect, alone or in combination with one or more of the first through eleventh aspects, process 500 includes transmitting, to a wireless communication device, an environmental status indication that indicates that the UE is located in the indoor environment.

In a thirteenth aspect, alone or in combination with the twelfth aspect, the wireless communication device comprises a base station.

In a fourteenth aspect, alone or in combination with the twelfth aspect, the wireless communication device comprises an access point.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
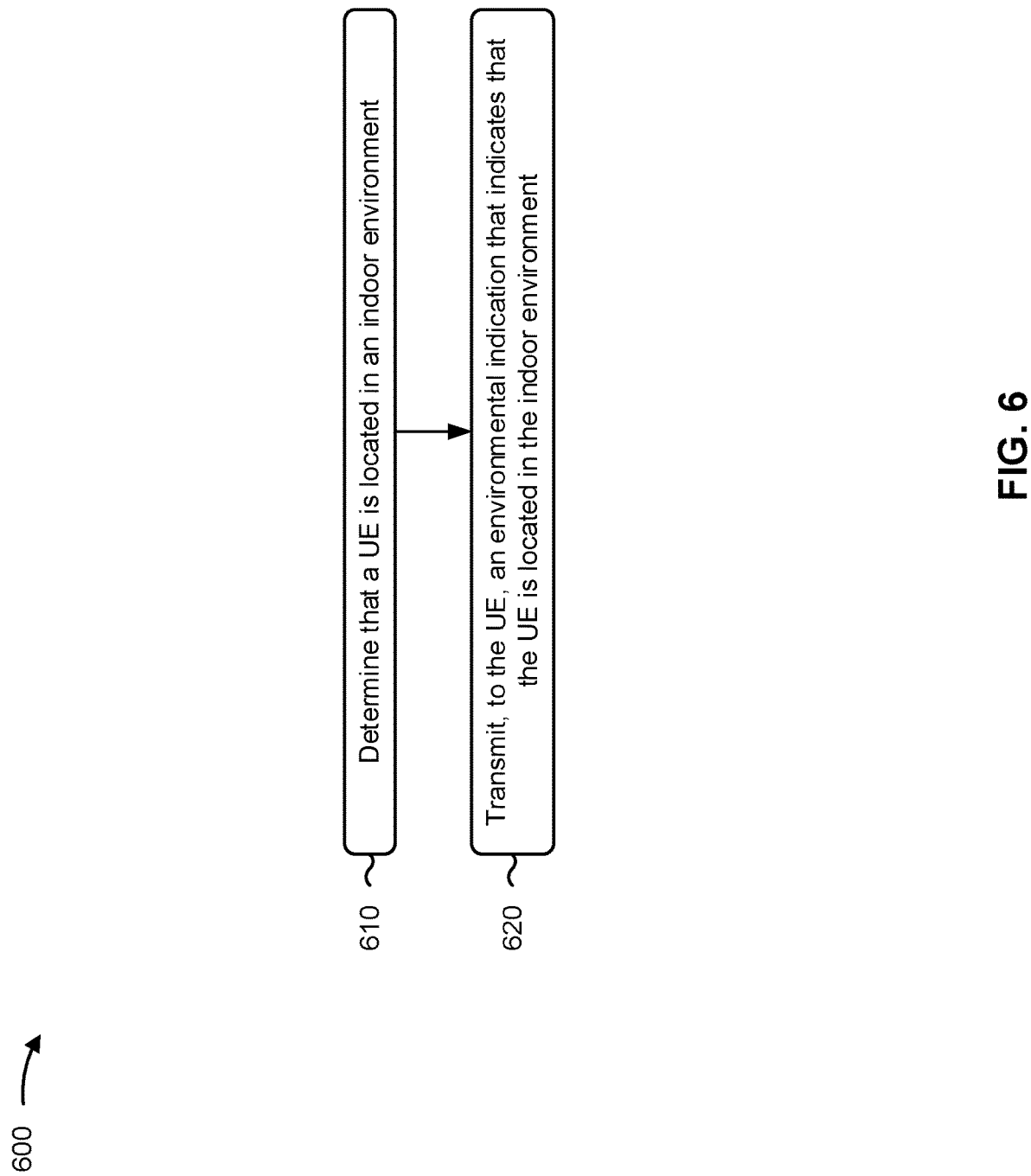

FIG. 6 is a diagram illustrating an example process 600 performed, for example, by a wireless communication device, in accordance with the present disclosure. Example process 600 is an example where the wireless communication device (e.g., wireless communication device 410 and/or wireless communication device 415) performs operations associated with an indoor communication mode for UEs.

As shown in FIG. 6, in some aspects, process 600 may include determining that a UE is located in an indoor environment (block 610). For example, the wireless communication device (e.g., using determination component 808, depicted in FIG. 8) may determine that a UE is located in an indoor environment, as described above.

As further shown in FIG. 6, in some aspects, process 600 may include transmitting, to the UE, an environmental indication that indicates that the UE is located in the indoor environment (block 620). For example, the wireless communication device (e.g., using transmission component 804, depicted in FIG. 8) may transmit, to the UE, an environmental indication that indicates that the UE is located in the indoor environment, as described above.

Process 600 may include additional aspects, such as any single aspect or any combination of aspects described below and/or in connection with one or more other processes described elsewhere herein.

In a first aspect, process 600 includes receiving, from the UE, a sensing measurement report that indicates one or more sensor measurements, wherein determining that the UE is located in the indoor environment comprises determining that the UE is located in the indoor environment based at least in part on the sensing measurement report; and transmitting an environmental indication to the UE.

In a second aspect, alone or in combination with the first aspect, process 600 includes configuring, based at least in part on determining that the UE is located in the indoor environment, a set of transmission parameters associated with the UE.

In a third aspect, alone or in combination with the second aspect, process 600 includes transmitting the set of transmission parameters to the UE.

In a fourth aspect, alone or in combination with one or more of the first through third aspects, process 600 includes receiving a signal from the UE, and performing one or more measurements associated with the signal, wherein determining that the UE is located in the indoor environment comprises determining that the UE is located in the indoor environment based at least in part on the one or more measurements associated with the signal.

In a fifth aspect, alone or in combination with one or more of the first through fourth aspects, process 600 includes detecting a transition of the UE from the indoor environment to a partial indoor environment, and transmitting, to the UE, an environmental indication that indicates that the UE is located in the partial indoor environment.

In a sixth aspect, alone or in combination with one or more of the first through fifth aspects, process 600 includes transmitting, to an additional wireless communication device, an environmental status indication that indicates that the UE is located in the indoor environment.

In a seventh aspect, alone or in combination with the sixth aspect, the additional wireless communication device comprises a base station.

In an eighth aspect, alone or in combination with the sixth aspect, the wireless communication device comprises an access point.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
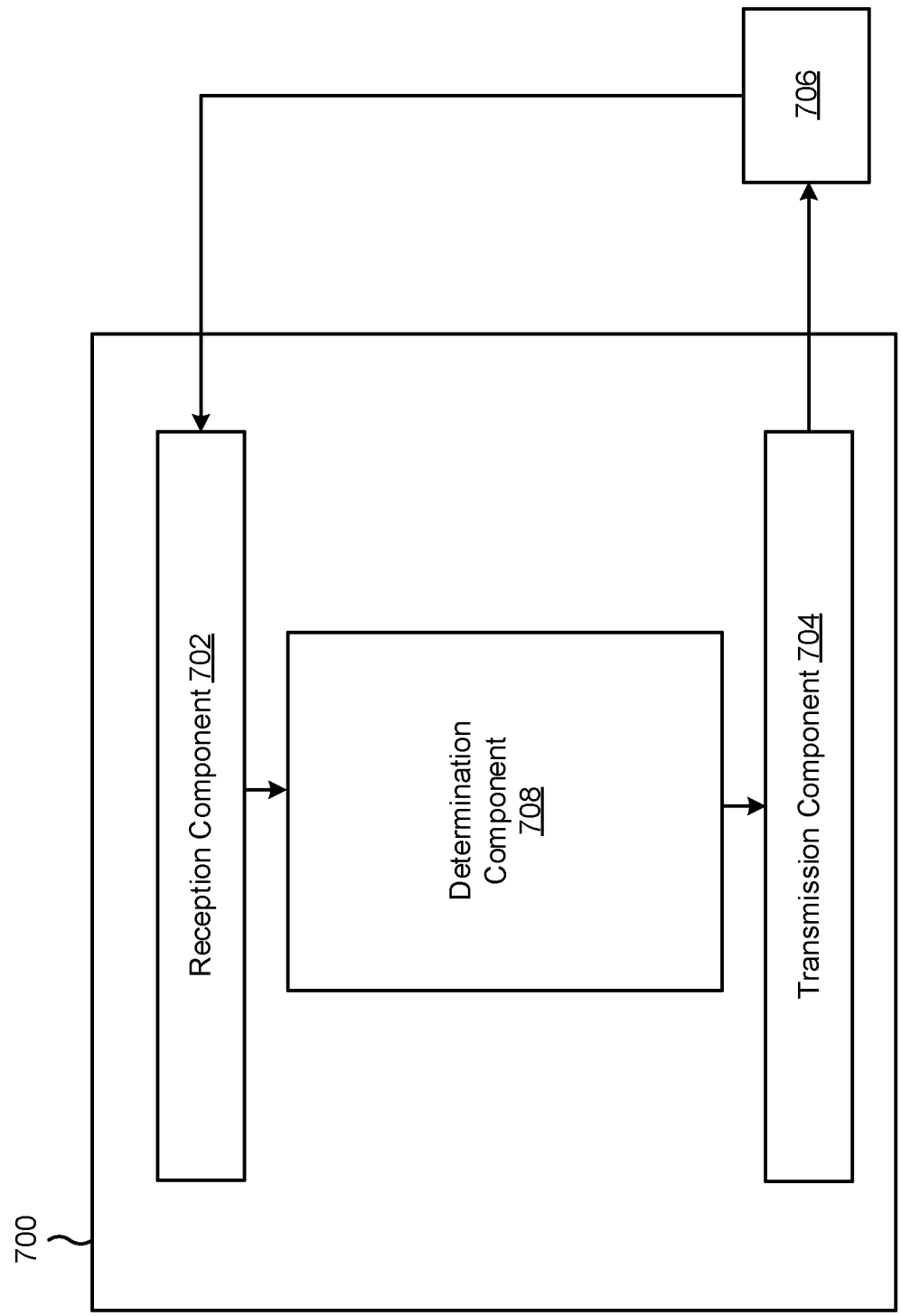
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine that the UE is located in an indoor environment. In some aspects, the determination component 708 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver. The reception component 702 and/or the transmission component 704 may communicate using an indoor communication mode based at least in part on determining that the UE is located in the indoor environment. The determination component 708 may obtain, using a sensor, one or more sensor measurements associated with the indoor environment wherein determining that the UE is located in the indoor environment comprises determining that the UE is located in the indoor environment based at least in part on the one or more sensor measurements.

The determination component 708 may compare the one or more sensor measurements to information in a knowledge database, wherein determining that the UE is located in the indoor environment comprises determining that the UE is located in the indoor environment based at least in part on comparing the one or more sensor measurements to the information. The reception component 702 may receive an environmental indication from an access point, wherein determining that the UE is located in the indoor environment comprises determining that the UE is located in the indoor environment based at least in part on the environmental indication.

The reception component 702 may receive a signal from an access point. The determination component 708 may perform one or more measurements associated with the signal, wherein determining that the UE is located in the indoor environment comprises determining that the UE is located in the indoor environment based at least in part on the one or more measurements associated with the signal. The determination component 708 may detect a transition of the UE from the indoor environment to an outdoor environment. The reception component 702 and/or transmission component 704 may communicate using an outdoor communication mode based at least in part on detecting the transition.

The determination component 708 may detect a transition of the UE from the indoor environment to a partial indoor environment. The reception component 702 and/or transmission component 704 may communicate using a partial indoor communication mode based at least in part on detecting the transition. The transmission component 704 may transmit, to a wireless communication device, an environmental status indication that indicates that the UE is located in the indoor environment.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
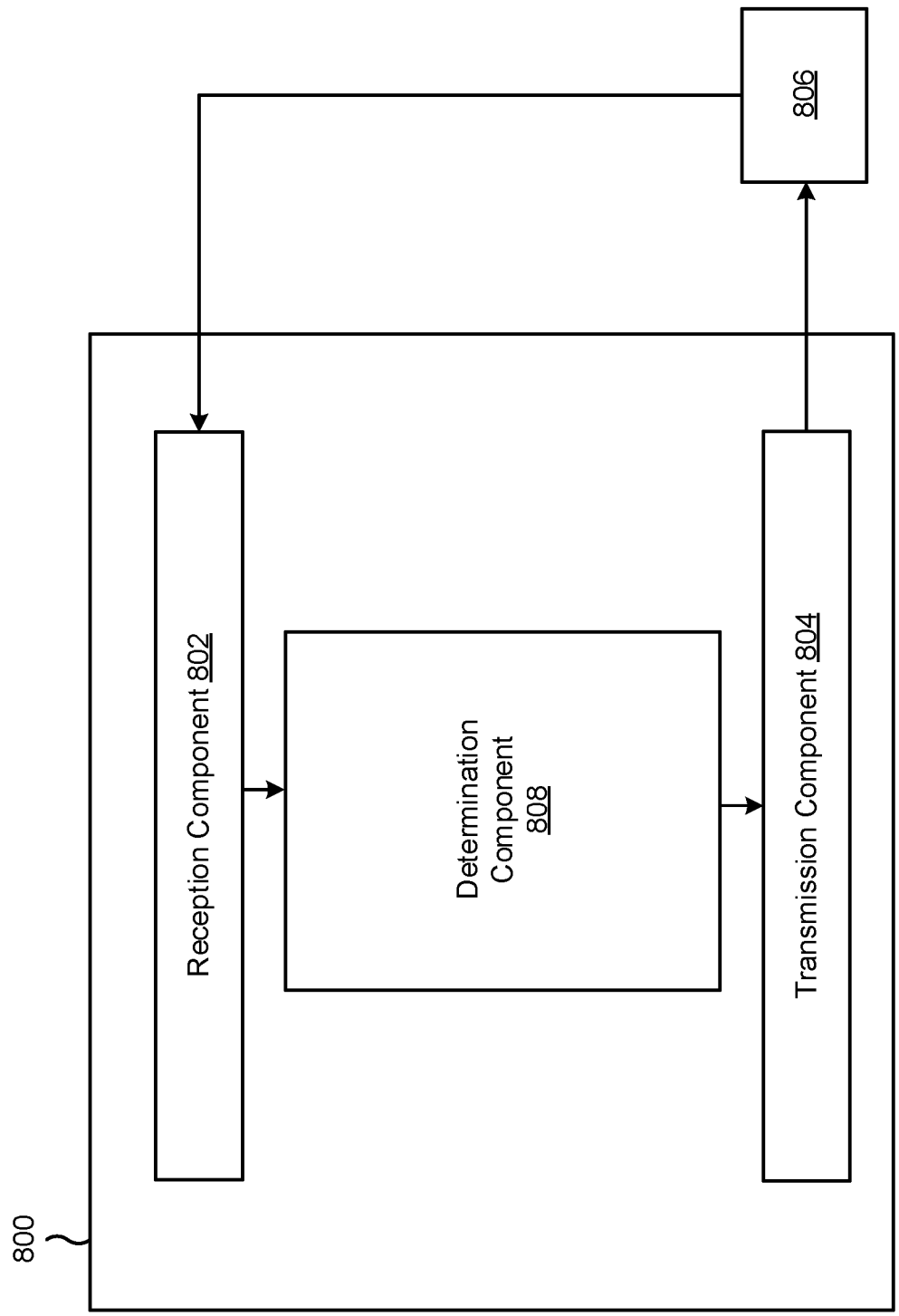

FIG. 8 is a block diagram of an example apparatus 800 for wireless communication. The apparatus 800 may be a wireless communication device (e.g., an access point or a base station), or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the wireless communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The determination component 808 may determine that a UE is located in an indoor environment. The transmission component 804 may transmit, to the UE, an environmental indication that indicates that the UE is located in the indoor environment. The reception component 802 may receive a signal from the UE. The determination component 808 may perform one or more measurements associated with the signal wherein determining that the UE is located in the indoor environment comprises determining that the UE is located in the indoor environment based at least in part on the one or more measurements associated with the signal.

The determination component 808 may detect a transition of the UE from the indoor environment to a partial indoor environment. The transmission component 804 may transmit, to the UE, an environmental indication that indicates that the UE is located in the indoor environment. The transmission component 804 may transmit, to an additional wireless communication device, an environmental status indication that indicates that the UE is located in the indoor environment.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: determining that the UE is located in an indoor environment; and communicating using an indoor communication mode based at least in part on determining that the UE is located in the indoor environment.

Aspect 2: The method of aspect 1, further comprising obtaining, using a sensor, one or more sensor measurements associated with the indoor environment, wherein determining that the UE is located in the indoor environment comprises determining that the UE is located in the indoor environment based at least in part on the one or more sensor measurements.

Aspect 3: The method of aspect 2, wherein the sensor comprises a radar device.

Aspect 4: The method of aspect 2, wherein the sensor comprises a light detection and ranging device.

Aspect 5: The method of any of aspects 2-4, further comprising comparing the one or more sensor measurements to information in a knowledge database, wherein determining that the UE is located in the indoor environment comprises determining that the UE is located in the indoor environment based at least in part on comparing the one or more sensor measurements to the information.

Aspect 6: The method of any of aspects 2-5, further comprising: generating a sensing measurement report that indicates the one or more sensor measurements; transmitting the sensing measurement report to a wireless communication device; and receiving an environmental indication from the wireless communication device, wherein the environmental indication is based at least in part on the sensing measurement report.

Aspect 7: The method of aspect 6, further comprising receiving a set of transmission parameters from the wireless communication device, wherein the set of transmission parameters is based at least in part on the environmental indication.

Aspect 8: The method of either of aspects 6 or 7, further comprising receiving an environmental indication from an access point, wherein determining that the UE is located in the indoor environment comprises determining that the UE is located in the indoor environment based at least in part on the environmental indication.

Aspect 9: The method of any of aspects 1-8, further comprising: receiving a signal from an access point; and performing one or more measurements associated with the signal, wherein determining that the UE is located in the indoor environment comprises determining that the UE is located in the indoor environment based at least in part on the one or more measurements associated with the signal.

Aspect 10: The method of any of aspects 1-9, further comprising: detecting a transition of the UE from the indoor environment to an outdoor environment; and communicating using an outdoor communication mode based at least in part on detecting the transition.

Aspect 11: The method of aspect 10, wherein detecting the transition of the UE from the indoor environment to the outdoor environment comprises detecting the transition of the UE from the indoor environment to the outdoor environment based at least in part on determining that a transition time condition is satisfied.

Aspect 12: The method of any of aspects 1-11, further comprising: detecting a transition of the UE from the indoor environment to a partial indoor environment; and communicating using a partial indoor communication mode based at least in part on detecting the transition.

Aspect 13: The method of any of aspects 1-12, further comprising transmitting, to a wireless communication device, an environmental status indication that indicates that the UE is located in the indoor environment.

Aspect 14: The method of aspect 13, wherein the wireless communication device comprises a base station.

Aspect 15: The method of aspect 13, wherein the wireless communication device comprises an access point.

Aspect 16: A method of wireless communication performed by a wireless communication device, comprising: determining that a user equipment (UE) is located in an indoor environment; and transmitting, to the UE, an environmental indication that indicates that the UE is located in the indoor environment.

Aspect 17: The method of aspect 16, further comprising: receiving, from the UE, a sensing measurement report that indicates one or more sensor measurements, wherein determining that the UE is located in the indoor environment comprises determining that the UE is located in the indoor environment based at least in part on the sensing measurement report; and transmitting an environmental indication to the UE.

Aspect 18: The method of aspect 17, further comprising configuring, based at least in part on determining that the UE is located in the indoor environment, a set of transmission parameters associated with the UE.

Aspect 19: The method of aspect 18, further comprising transmitting the set of transmission parameters to the UE.

Aspect 20: The method of any of aspects 16-19, further comprising: receiving a signal from the UE; and performing one or more measurements associated with the signal, wherein determining that the UE is located in the indoor environment comprises determining that the UE is located in the indoor environment based at least in part on the one or more measurements associated with the signal.

Aspect 21: The method of any of aspects 16-19, further comprising: detecting a transition of the UE from the indoor environment to a partial indoor environment; and transmitting, to the UE, an environmental indication that indicates that the UE is located in the partial indoor environment.

Aspect 22: The method of any of aspects 16-19, further comprising transmitting, to an additional wireless communication device, an environmental status indication that indicates that the UE is located in the indoor environment.

Aspect 23: The method of aspect 22, wherein the additional wireless communication device comprises a base station.

Aspect 24: The method of aspect 22, wherein the wireless communication device comprises an access point.

Aspect 25: An apparatus for wireless communication at a device, comprising a processor; memory coupled with the processor; and instructions stored in the memory and executable by the processor to cause the apparatus to perform the method of one or more aspects of aspects 1-15.

Aspect 26: A device for wireless communication, comprising a memory and one or more processors coupled to the memory, the memory and the one or more processors configured to perform the method of one or more aspects of aspects 1-15.

Aspect 27: An apparatus for wireless communication, comprising at least one means for performing the method of one or more aspects of aspects 1-15.

Aspect 28: A non-transitory computer-readable medium storing code for wireless communication, the code comprising instructions executable by a processor to perform the method of one or more aspects of aspects 1-15.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-15.

Aspect 30: An apparatus for wireless communication at a device, comprising a processor; memory coupled with the processor; and instructions stored in the memory and executable by the processor to cause the apparatus to perform the method of one or more aspects of aspects 16-24.

Aspect 31: A device for wireless communication, comprising a memory and one or more processors coupled to the memory, the memory and the one or more processors configured to perform the method of one or more aspects of aspects 16-24.

Aspect 32: An apparatus for wireless communication, comprising at least one means for performing the method of one or more aspects of aspects 16-24.

Aspect 33: A non-transitory computer-readable medium storing code for wireless communication, the code comprising instructions executable by a processor to perform the method of one or more aspects of aspects 16-24.

Aspect 34: A non-transitory computer-readable medium storing a set of instructions for wireless communication, the set of instructions comprising one or more instructions that, when executed by one or more processors of a device, cause the device to perform the method of one or more aspects of aspects 16-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      determine that the UE is located in an indoor environment; and
      communicate, based at least in part on the determination, using an indoor communication mode,
      wherein the indoor communication mode provides a different functionality in association with the indoor environment, compared to an outdoor communication mode in association with an outdoor environment, based at least in part on adjusting one or more communication parameters for the indoor communication mode as compared to the outdoor communication mode, and
      wherein the one or more adjusted communication parameters comprise:
         a different beam than the outdoor communication mode, or
         a different frequency than the outdoor communication mode.

2. The UE of claim 1,
   wherein the one or more processors, to determine that the UE is located in the indoor environment, are configured to determine that the UE is located in the indoor environment based at least in part on a mapping between an environment and one or more sensor measurements from a radar device or a light detection and ranging device.

3. The UE of claim 2,
   wherein the one or more processors are further configured to compare the one or more sensor measurements to information in a knowledge database,
      wherein the one or more processors, to determine that the UE is located in the indoor environment, are configured to determine that the UE is located in the indoor environment based at least in part on comparing the one or more sensor measurements to the information.

4. The UE of claim 2,
wherein the one or more processors are further configured to:
generate a sensing measurement report that indicates the one or more sensor measurements;
transmit the sensing measurement report to a wireless communication device; and
receive an environmental indication from the wireless communication device, wherein the environmental indication is based at least in part on the sensing measurement report.

5. The UE of claim 4,
wherein the one or more processors are further configured to receive a set of transmission parameters from the wireless communication device, wherein the set of transmission parameters is based at least in part on the environmental indication and includes the one or more adjusted communication parameters.

6. The UE of claim 4,
wherein the one or more processors are further configured to receive the environmental indication from an access point,
wherein the one or more processors, to determine that the UE is located in the indoor environment, are configured to determine that the UE is located in the indoor environment based at least in part on the environmental indication.

7. The UE of claim 1,
wherein the one or more processors are further configured to:
receive a signal from an access point; and
perform one or more measurements associated with the signal,
wherein the one or more processors, to determine that the UE is located in the indoor environment, are configured to determine that the UE is located in the indoor environment based at least in part on the one or more measurements associated with the signal.

8. The UE of claim 1,
wherein the one or more processors are further configured to:
detect a transition of the UE from the indoor environment to the outdoor environment; and
communicate using the outdoor communication mode based at least in part on detecting the transition.

9. The UE of claim 8,
wherein the one or more processors, to detect the transition of the UE from the indoor environment to the outdoor environment, are configured to detect the transition of the UE from the indoor environment to the outdoor environment based at least in part on determining that a transition time condition is satisfied.

10. The UE of claim 1,
wherein the one or more processors are further configured to:
detect a transition of the UE from the indoor environment to a partial indoor environment; and
communicate using a partial indoor communication mode based at least in part on detecting the transition.

11. The UE of claim 1,
wherein the one or more processors are further configured to transmit, to a wireless communication device, an environmental status indication that indicates that the UE is located in the indoor environment.

12. The UE of claim 11,
wherein the wireless communication device comprises a base station.

13. The UE of claim 11,
wherein the wireless communication device comprises an access point.

14. A wireless communication device for wireless communication, comprising:
one or more memories; and
one or more processors, coupled to the one or more memories, configured to:
determine that a user equipment (UE) is located in an indoor environment associated with an indoor communication mode,
wherein the indoor communication mode provides a different functionality in association with the indoor environment, compared to an outdoor communication mode in association with an outdoor environment, based at least in part on adjusting one or more communication parameters for the indoor communication mode as compared to the outdoor communication mode, and
wherein the one or more adjusted communication parameters comprise:
a different beam than the outdoor communication mode, or
a different frequency than the outdoor communication mode; and
transmit, to the UE, an environmental indication that indicates that the UE is located in the indoor environment.

15. The wireless communication device of claim 14,
wherein the one or more processors are further configured to:
receive, from the UE, a sensing measurement report that indicates one or more sensor measurements,
wherein the one or more processors, to determine that the UE is located in the indoor environment, are configured to determine that the UE is located in the indoor environment based at least in part on the sensing measurement report.

16. The wireless communication device of claim 15,
wherein the one or more processors are further configured to configure, based at least in part on determining that the UE is located in the indoor environment, a set of transmission parameters associated with the UE, the set of transmission parameters including the one or more adjusted communication parameters.

17. The wireless communication device of claim 16,
wherein the one or more processors are further configured to transmit the set of transmission parameters to the UE.

18. The wireless communication device of claim 14,
wherein the one or more processors are further configured to:
receive a signal from the UE; and
perform one or more measurements associated with the signal,
wherein the one or more processors, to determine that the UE is located in the indoor environment, are configured to determine that the UE is located in the indoor environment based at least in part on the one or more measurements associated with the signal.

19. The wireless communication device of claim 14, wherein the one or more processors are further configured to:
detect a transition of the UE from the indoor environment to a partial indoor environment; and
transmit, to the UE, an environmental indication that indicates that the UE is located in the partial indoor environment.

20. The wireless communication device of claim 14, wherein the one or more processors are further configured to transmit, to an additional wireless communication device, an environmental status indication that indicates that the UE is located in the indoor environment.

21. The wireless communication device of claim 20, wherein the additional wireless communication device comprises a base station.

22. The wireless communication device of claim 14, wherein the wireless communication device comprises an access point.

23. A method of wireless communication performed by a user equipment (UE), comprising:
determining that the UE is located in an indoor environment; and
communicating, based at least in part on the determination, using an indoor communication mode,
wherein the indoor communication mode provides a different functionality in association with the indoor environment, compared to an outdoor communication mode in association with an outdoor environment, based at least in part on adjusting one or more communication parameters for the indoor communication mode as compared to the outdoor communication mode, and
wherein the one or more adjusted communication parameters comprise:
a different beam than the outdoor communication mode, or
a different frequency than the outdoor communication mode.

24. The method of claim 23, wherein determining that the UE is located in the indoor environment comprises determining that the UE is located in the indoor environment based at least in part on a mapping between an environment and one or more sensor measurements from a radar device or a light detection and ranging device.

25. The method of claim 23, further comprising:
detecting a transition of the UE from the indoor environment to the outdoor environment; and
communicating using the outdoor communication mode based at least in part on detecting the transition.

26. The method of claim 23, further comprising:
detecting a transition of the UE from the indoor environment to a partial indoor environment; and
communicating using a partial indoor communication mode based at least in part on detecting the transition.

27. A method of wireless communication performed by a wireless communication device, comprising:
determining that a user equipment (UE) is located in an indoor environment associated with an indoor communication mode,
wherein the indoor communication mode provides a different functionality in association with the indoor environment, compared to an outdoor communication mode in association with an outdoor environment, based at least in part on adjusting one or more communication parameters for the indoor communication mode as compared to the outdoor communication mode, and
wherein the one or more adjusted communication parameters comprise:
a different beam than the outdoor communication mode, or
a different frequency than the outdoor communication mode; and
transmitting, to the UE, an environmental indication that indicates that the UE is located in the indoor environment.

28. The method of claim 27, further comprising:
detecting a transition of the UE from the indoor environment to a partial indoor environment; and
transmitting, to the UE, an environmental indication that indicates that the UE is located in the partial indoor environment.

29. The method of claim 24, further comprising:
comparing the one or more sensor measurements to information in a knowledge database,
wherein determining that the UE is located in the indoor environment is based at least in part on comparing the one or more sensor measurements to the information.

30. The method of claim 24, further comprising:
generating a sensing measurement report that indicates the one or more sensor measurements;
transmitting the sensing measurement report to a wireless communication device; and
receiving an environmental indication from the wireless communication device, wherein the environmental indication is based at least in part on the sensing measurement report.

* * * * *